3,671,214
INHIBITING THE GROWTH OF PLANTS WITH SUBSTITUTED INDOLE DERIVATIVES
Gerhard H. Alt, St. Louis, Mo., assignor to Monsanto Company, St. Louis, Mo.
No Drawing. Filed Jan. 2, 1970, Ser. No. 396
Int. Cl. A01n 9/22
U.S. Cl. 71—95
4 Claims

ABSTRACT OF THE DISCLOSURE

Novel process for preparing substituted indole derivatives by the reaction of an alkylated aniline with an α-hydroxy ketone and their use in herbicidal compositions.

---

This invention relates to a novel procedure for the preparation of substituted indole derivatives and their use in herbicidal compositions.

In accordance with this invention, it has been discovered that substituted indole derivatives of the formula

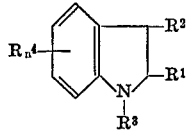

wherein $R^1$ is selected from the group consisting of primary or secondary alkyl having at least 1 and a maximum of 4 carbon atoms, phenyl, and substituted phenyl having a maximum of two substituents, said substituents being selected from the group consisting of halogen, nitro, and primary or secondary alkyl having at least 1 and a maximum of 4 carbon atoms; $R^2$ is selected from the group consisting of hydrogen and primary or secondary alkyl having at least 1 and a maximum of 4 carbon atoms; $R^1$ and $R^2$ can together form an alkylene having 3 to 6 carbon atoms; $R^3$ is selected from the group consisting of primary or secondary alkyl having at least 1 and a maximum of 4 carbon atoms, and benzyl; $R^4$ is primary or secondary alkyl having at least 1 and a maximum of 3 carbon atoms; and $n$ is one of the integers 0 through 1; can be easily formed by a novel process which comprises reacting an α-hydroxy ketone of the formula

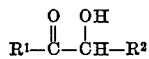

with a secondary amine of the formula

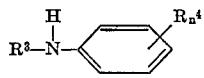

wherein $R^1$, $R^2$, $R^3$, $R^4$, and $n$ are as defined above.

In the preferred embodiment of this invention $R^1$ is phenyl or halophenyl; $R^2$ is hydrogen; or $R^1$ and $R^2$ can together form an alkylene having 4 carbon atoms; $R^3$ is primary or secondary alkyl having at least 1 and a maximum of 4 carbon atoms; and $n$ is 0.

In the practice of this invention, an excess of the secondary amine may be used. In the preferred method of operation, equimolar quantities of the α-hydroxy ketone and the secondary amine are used. The reaction can be carried out in the absence of solvent, however, it is more convenient to carry out the reaction in an inert water immiscible organic solvent, such as xylene, benzene, toluene, chlorobenzene, carbon tetrachloride and the like, the preferred inert organic solvent being xylene. The reaction is carried out in the presence of an acid catalyst, such as p-toluenesulfonic acid, sulfuric acid, benzenesulfonic acid and the like, the preferred acid catalyst being p-toluenesulfonic acid.

The reaction is generally conducted at a temperature range of from about 70° to about 200° C., the temperature being such that the water formed in the reaction is distilled off. Temperatures above and below this range can also be used, however, at lower temperatures the reaction takes place at a much slower rate, while at higher temperatures side reactions may occur. In the preferred method of operation, the reaction is conducted in a temperature range of from about 125° C. to about 150° C. The time of the reaction, will vary, being dependent upon the nature of the reactants, the absence or presence of solvent, and the reaction temperature. The usual reaction time is from about 10 hours to about 50 hours.

Suitable α-hydroxy ketones for the practice of this invention are:

α-hydroxy cyclohexanone,
α-hydroxy propiono-2-chlorophenone,
α-hydroxy acetophenone,
α-hydroxy aceto-2-bromophenone,
α-hydroxy cyclopentanone,
α-hydroxy cycloheptanone,
α-hydroxy cyclooctanone,
α-hydroxy-propiono-2-iodophenone,
α-hydroxy propiono-2-fluorophenone,
α-hydroxy propiono-2,4-difluorophenone,
α-hydroxy butyro-2-fluorophenone,
α-hydroxy pentano-2-fluorophenone,
α-hydroxy aceto-2,4-dinitrophenone,
α-hydroxy aceto-2,4-dimethylphenone,
α-hydroxy aceto-2,4-diethylphenone,
α-hydroxy pentano-2,4-dimethylphenone,
α-hydroxy butyro-3,5-dimethylphenone,
α-hydroxy pentano-2-fluorophenone,
α-hydroxy aceto-2,4-dinitrophenone,
α-hydroxy aceto-2,4-dimethylphenone,
α-hydroxy aceto-2,4-diethylphenone,
α-hydroxy pentano-2,4-dimethylphenone,
α-hydroxy butyro-3,5-dimethylphenone,
α-hydroxy pentano-4-chlorophenone,
α-hydroxy propiono-3,5-diiodophenone,
α-hydroxy aceto-3,5-dimethylphenone,
α-hydroxy pentano-3,5-dibromophenone,
α-hydroxy aceto-3,5-dibromophenone,
α-hydroxy aceto-4-propylphenone,
α-hydroxy aceto-3,5-dinitrophenone,
1-hydroxy-2-pentanone,
α-hydroxy cyclopentanone,
4-hydroxy-3-hexanone,
5-hydroxy-4-octanone,
2-hydroxy-3-pentanone,
3-hydroxy-2-pentanone,
3-hydroxy-2-hexanone,
3-hydroxy-2-heptanone,
4-hydroxy-3-heptanone,
and the like.

Suitable secondary amines for the practice of this invention are:
N-ethyl aniline,
N-benzyl aniline,
N-propyl aniline,
N-butyl-4-methyl aniline,
N-isopropyl aniline,
N-isobutyl aniline,
N-benzyl-3-methyl aniline,
N-benzyl aniline,
N-benzyl-4-propyl aniline,
N-butyl aniline,
N-propyl-3-ethyl aniline,
N-ethyl-3-ethyl aniline,
N-methyl-2-methyl aniline,
N-methyl-3-propyl aniline,
N-s. butyl,
N-benzyl-3-ethyl aniline,
N-benzyl-4-propyl aniline,
N-benzyl-4-ethyl aniline,
N-benzyl-2-ethyl aniline,
N-benzyl-3-isopropyl aniline,
N-benzyl-4-isopropyl aniline,
N-ethyl-2-methyl aniline,
N-methyl-3-methyl aniline,
N-benzyl-2-propyl aniline,
and the like.

The starting compounds of this invention can be obtained commercially or can be prepared by methods well known to those skilled in the art. For example, the α-hydroxy ketones may be prepared by the following methods: hydration of acetylenic carbinols in the presence of mercuric sulfate, oxidation of 1,2 diols, partial reduction of 1,2-di-carbonyl compounds, acyloin type condensations, and by hydrolysis of α-halogenated ketones. The secondary amines of this invention can be prepared by: reaction of primary aliphatic amines and aryl halides in the presence of copper, reduction of aryl isocyanides, catalytic reduction of Schiff's bases or substituted amides, and other methods known to those skilled in the art.

Following the reaction between the α-hydroxy ketone and the secondary amine, the desired product is separated and purified by conventional procedures such as filtration, chromatography, and recrystallization from various organic solvents.

The following examples illustrate the present invention and are not to be construed as limiting. Parts are by weight unless otherwise stated.

EXAMPLE I 9-benzyl-6-methyl - 1,2,3,4 - tetrahydrocarbazole of the formula

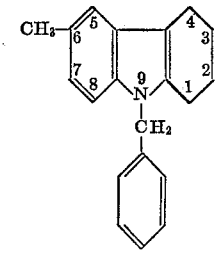

was prepared according to the following procedure:
A suitable vessel equipped with refluxing means and a Dean-Stark trap, was charged with 11.4 parts α-hydroxy cyclohexanone, 20 parts N-benzyl-p-toluidine, 132 parts xylene, and 0.3 part of p-toluenesulfonic acid. The resulting mixture was maintained at reflux temperature until the approximate stoichiometric quantity of water was collected. The solvent was removed from the reaction mixture and the viscous oil residue dissolved in hot ethanol. On cooling, the desired product separated from the solution as a solid, which was filtered off, yielding a colorless crystalline solid, M.P., 98–100° C.

Analysis.—Calc'd for $C_{20}H_{21}N$ (percent): C, 87.22; H, 7.69; N, 5.09. Found (percent): C, 87.00; H, 7.57; N, 4.94.

EXAMPLE 2

9-ethyl-1,2,3,4-tetrahydrocarbazole of the following formula

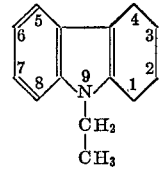

was prepared according to the following procedure:
A suitable vessel equipped with a refluxing means and a Dean-Stark trap was charged with 11.4 parts α-hydroxyhexanone, 13.3 parts N-ethylaniline, 133 parts xylene and 0.3 part p-toluenesulfonic acid. The resulting mixture was maintained at reflux temperature until the approximate stoichiometric amount of water was collected. The solvent was removed and the residue distilled, collecting the product distilling at 150–152° C./1.9 mm.

EXAMPLE 3

1-methyl-2-phenylindole of the following formula

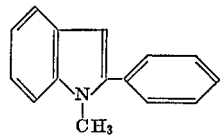

A suitable vessel equipped with a refluxing means and a Dean-Stark trap was charged with 12.3 parts α-hydroxy acetophenone, 10.7 parts N-methylaniline, 88 parts xylene and 0.3 part p-toluenesulfonic acid. The resulting mixture was maintained at reflux temperature for about 48 hours until the stoichiometric amount of water was collected. The solvent was then removed from the reaction mixture and the residue dissolved in hot ethanol. On cooling, the desired product separated from solution as a solid, which was filtered off, yielding a yellow crystalline solid, M.P., 99–101° C.

Following the procedure of the foregoing examples, and using the appropriate α-hydroxy ketones and secondary amines, the following indole derivatives were prepared:

EXAMPLES 4. 1-benzyl-2(3',5'-dichloro phenyl)-4-methylindole.
5. 1-ethyl-2(3'-chloro-5'-nitrophenyl)-6-methylindole.
6. 1-ethyl-2(3'-nitro-5'-methylphenyl)-5-ethylindole.
7. 1-methyl-2,3-dibutyl-4-propylindole.
8. 1-benzyl-2,3,6-trimethylindole.
9. 1-butyl-2(3'-chloro-5'-butylphenyl)-4-propylindole.
10. 1-benzyl-2(3'-bromo-5'-nitrophenyl) indole.
11. 1-methyl-2-ethyl-3-butyl-4-propylindole.
12. 1-benzyl-2(2',4'-dinitrophenyl)-6-isopropylindole.
13. 1-benzyl-2(2',4'-dipropylphenyl)-4-propylindole.
14. 1-benzyl-2(3',5'-diiodophenyl) indole.
15. 1-ethyl-2(3',5'-difluorophenyl)-5-ethylindole.
16. 1-benzyl-2(3'-iodo-5'-nitrophenyl)-7-methylindole.
17. 1-methyl-2(2',4'-dichlorophenyl) indole.
18. 1-methyl-2(2',4'-dichlorophenyl)-4-methylindole.
19. 9-benzyl-1,2,3,4-tetrahydrocarbazole.
20. 9-propyl-1,2,3,4-tetrahydrocarbazole.
21. 9-ethyl-5-propyl-1,2,3,4-tetrahydrocarbazole.
22. 9-methyl-5-ethyl-1,2,3,4-tetrahydrocarbazole.

EXAMPLE 23

The following example illustrates the herbicidal activity of the substituted indole derivatives of this invention.

A good grade of top soil is placed in aluminum pans and compacted to a depth of ⅜" to ½" from the top of each pan. A predetermined number of seeds of each of several plant species are placed on top of the soil in the pans. The seeds are covered with a ⅜" layer of prepared soil and the pan leveled.

The seed-containing pans are placed on a wet sand bench and maintained for approximately 14 days under ordinary conditions of sunlight and watering. The herbicidal compound is applied in spray form to the 2 week old plant specimens. The herbicidal sprays are acetone-water solvents containing 0.5% by weight of the herbicide. The treated plants are placed in a greenhouse and the effects are observed and recorded approximately 14 days thereafter.

The post-emergent herbicidal activity index used in this example is based upon the average percent injury of each plant species, and is defined as follows:

Numerical scale:      Herbicidal activity
0 _____ No herbicidal activity.
1 _____ Slight herbicidal activity.
2 _____ Moderate herbicidal activity.
3 _____ Severe herbicidal activity.
4 _____ Plant is dead.

The observed data is set forth in the following table wherein the botanical type is identified by an initial in accordance with the following code:

A—Morning Glory     H—Crab Grass
B—Wild Oats           I—Pigweed
C—Brome Grass       J—Soybean
D—Rye Grass          K—Wild Buckwheat
E—Radish              L—Tomato
F—Sugar Beets        M—Sorghum
G—Foxtail

TABLE I

Post-emergent herbicidal activity

Compound _____ (1)
Contact conc. (percent) _____ 0.5
Plant species:
    A _____ 1
    B _____ 0
    C _____ 0
    D _____ 0
    E _____ 1
    F _____ 1
    G _____ 1
    H _____ 1
    I _____ 1
    J _____ 0
    K _____ 1
    L _____ 2
    M _____ 0

[1] 1-methyl-2-phenylindole.

For the sake of brevity and simplicity, the term "active ingredient" will be used hereinafter in this specification to describe the indole derivatives of this invention, hereinbefore described.

The active ingredient can be admixed with one or more adjuvants which can be solid or liquid extenders, carriers, diluents, conditioning agents and the like, to form herbicidal compositions. Herbicidal formulations contain the active ingredients of this invention with wettable powders, aqueous suspensions, dust formulations, emulsifiable oils and solutions in solvents. In general, these formulations can all contain one or more surface-active agents. Herbicidal mixtures are applied at a rate of 1 to 50 lbs. per acre of active ingredient for general herbicidal effect.

Surface-active agents which can be used in herbicidal formulations are well known to those skilled in the art and have been well documented in U.S. patents, bulletins and textbooks.

The preparation, formulations and particle size of the wettable powders, aqueous suspensions, dusts, emulsifiable oils and solutions in solvents are also well known to those skilled in the art and well documented.

Th active ingredient is usually present in the herbicidal compositions in a range of about 0.5 to 95 parts by weight per 100 parts by weight of wettable powder and dust formulations; 5 to 95 parts by weight per 100 parts by weight emulsifiable oil formulations. Formulations containing other than the above quantities of active ingredient can easily be prepared by those skilled in the art.

Application of the herbicidal compositions of this invention to the plant is well known to those skilled in the art. The application of liquid and particulate solid herbicidal formulations to the above ground portions of plants can be carried out by conventional methods, e.g., power dusters, boom and hand sprayers and spray dusters.

While the illustrative embodiments of the invention have been described herein before with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein, but rather the claims be construed as encompassing all the features of patentable novelty which reside in the present invention including all features which would be treated as equivalents thereof by those skilled in the art to which the invention pertains.

What is claimed is:

1. A method of inhibiting the growth of plants which comprises contacting a plant with a herbicidally effective amount of one or more of the compounds of the formulae

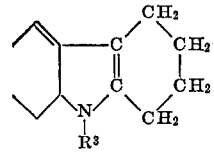

and

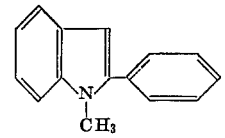

wherein $R^3$ is selected from the group consisting of primary or secondary alkyl having at least 1 and a maximum of 4 carbon atoms, and benzyl.

2. A method according to claim 1 wherein said compound has the formula

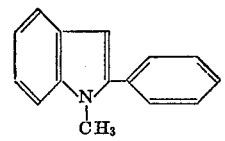

3. A method according to claim 1 wherein said compound has the formula

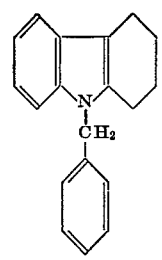

4. A method according to claim 1 wherein said compound has the formula
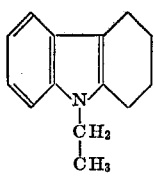
References Cited
Kochetkov et al.: Chem. Abst. vol. 51 (1957) 8720g.
Champaigne et al.: Chem. Abst. vol. 53 (1959) 21880e.
Lesiak et al.: Chem. Abst. vol. 63 (1965) 13194f.
Thimann: Chem. Abst. vol. 53 (1959) 7326b.
Khan et al.: Chem. Abst. vol. 64 (1966) 16543d.
LEWIS GOTTS, Primary Examiner
C. L. MILLS, Assistant Examiner
U.S. Cl. X.R.
260—315, 319.1, 326.11

UNITED STATES PATENT OFFICE
CERTIFICATE OF CORRECTION

Patent No. 3,671,214                    Dated June 20, 1972

Inventor(s)     Gerhard H. Alt

It is certified that error appears in the above-identified patent and that said Letters Patent are hereby corrected as shown below:

Claim 1, the first formula, which reads as follows

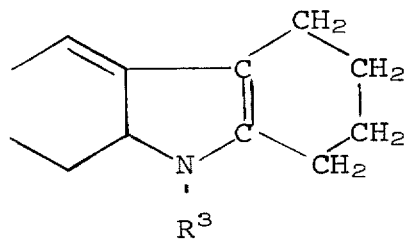

should read as follows

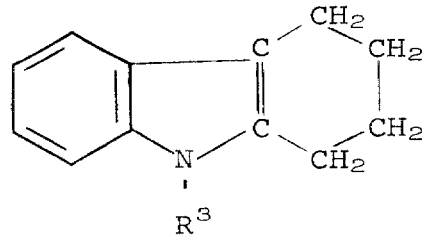

Signed and sealed this 6th day of March 1973.

(SEAL)
Attest:

EDWARD M. FLETCHER, JR.
Attesting Officer

ROBERT GOTTSCHALK
Commissioner of Patents